(12) United States Patent
Balconi et al.

(10) Patent No.: US 7,790,222 B2
(45) Date of Patent: Sep. 7, 2010

(54) METHOD FOR PRODUCING A COATING LAYER MADE OF EXPANDABLE AND CROSS-LINKABLE MATERIAL IN A CABLE

(75) Inventors: Luca Balconi, Bresso (IT); Alberto Bareggi, Milan (IT); Sergio Belli, Leghorn (IT)

(73) Assignee: Prysmian Cavi e Sistemi Energia S.R.L., Milan (IT)

( * ) Notice: Subject to any disclaimer, the term of this patent is extended or adjusted under 35 U.S.C. 154(b) by 858 days.

(21) Appl. No.: 10/538,741

(22) PCT Filed: Dec. 23, 2002

(86) PCT No.: PCT/IT02/00824

§ 371 (c)(1),
(2), (4) Date: Jun. 14, 2005

(87) PCT Pub. No.: WO2004/057626

PCT Pub. Date: Jul. 8, 2004

(65) Prior Publication Data

US 2006/0051499 A1  Mar. 9, 2006

(51) Int. Cl.
*B05D 5/12* (2006.01)
(52) U.S. Cl. .................. 427/118; 427/117; 427/356; 427/388.2
(58) Field of Classification Search .................. 427/118, 427/117, 356, 388.2
See application file for complete search history.

(56) References Cited

U.S. PATENT DOCUMENTS

| | | | |
|---|---|---|---|
| 5,708,128 A * | 1/1998 | Oikawa et al. ............... 528/353 |
| 6,064,000 A * | 5/2000 | Kim ............................. 174/36 |
| 6,207,772 B1 * | 3/2001 | Hatsuda et al. ............... 526/88 |
| 6,436,557 B1 * | 8/2002 | Moriuchi et al. ............. 428/689 |
| 6,455,769 B1 | 9/2002 | Belli et al. |
| 2001/0002075 A1 * | 5/2001 | Chaudhary et al. ............ 264/51 |

FOREIGN PATENT DOCUMENTS

| | | |
|---|---|---|
| EP | 0 194 375 A2 | 9/1986 |
| EP | 0 981 812 B1 | 3/2000 |
| WO | WO-98/52197 | 11/1998 |
| WO | WO 99/33070 * | 7/1999 |
| WO | WO 01/38060 A1 * | 5/2001 |

* cited by examiner

*Primary Examiner*—Timothy H Meeks
*Assistant Examiner*—Nathan T Leong
(74) *Attorney, Agent, or Firm*—Finnegan, Henderson, Farabow, Garrett & Dunner, L.L.P.

(57) ABSTRACT

A method for producing a cable including at least one transmissive element, for example, an element transmitting electrical energy or optionally optical signals as well, and an expanded and cross-linked coating layer in a radially outer position with respect to the at least one transmissive element, the coating layer having a composition including an expandable and cross-linkable polymeric material. The method includes a) extruding the composition; b) forming a coating layer made of expandable and cross-linkable polymeric material with the composition thus extruded; c) expanding the coating layer made of expandable and cross-linkable polymeric material; and d) cross-linking the coating layer made of expandable and cross-linkable polymeric material. The expanding and cross-linking steps c) and d) are carried out by heating the coating layer made of expandable and cross-linkable polymeric material at atmospheric pressure by means of a suitable heating fluid. Savings in production time and costs are attained by the method.

13 Claims, 2 Drawing Sheets

METHOD FOR PRODUCING A COATING LAYER MADE OF EXPANDABLE AND CROSS-LINKABLE MATERIAL IN A CABLE

CROSS REFERENCE TO RELATE APPLICATION

This application is a national phase application based on PCT/IT2002/000824, filed Dec. 23, 2002, the content of which is incorporated herein by reference.

FIELD OF THE INVENTION

The present invention refers to a method for producing a cable including:
- at least one transmissive element; and
- an expanded and cross-linked coating layer in a radially outer position with respect to said at least one transmissive element, said coating layer comprising a composition including an expandable and cross-linkable polymeric material.

The transmissive element may, for example, be an element transmitting electrical energy or optionally optical signals as well.

In the present description and in the subsequent claims, the term "electrical energy transmissive element" is used to indicate any element capable of transmitting electrical energy, such as for example a metallic conductor element.

In the present description and in the subsequent claims, the term "mixed electro-optical transmissive element" is used to indicate any element capable of transmitting both electrical energy and optical signals, such as a transmission element comprising at least one metallic conductor and at least one optical fibre.

Depending on the nature of the transmissive element, in addition to the latter, the cable may further comprise at least one electrical insulation element or, respectively, two respective elements, one of which is an electrical insulation element and one is a containment element (such as a tube, a sheath, a microsheath, a grooved core or a ribbon) arranged in a radially outer position with respect to the corresponding transmissive element.

In the present description and in the subsequent claims, the expression "expanded polymeric material" is used to indicate a polymeric material having a predetermined percentage of so-called "free" space within the material, i.e. a space not occupied by the polymeric material, but by gas or air. For the purposes of the present description, such percentage of free space is typically greater than about 5% of the total volume of the polymeric material.

Analogously, in the present description and in the subsequent claims, the expression "expandable polymeric material" is used to indicate a suitable polymeric material which, when expanded, changes into an expanded polymeric material as defined above.

As regards the ways by which the method of expansion of a polymeric material of such a type expands, reference is made to patent application WO98/52197 in the name of the Applicant.

In the present description and in the subsequent claims, the expression "cross-linked polymeric material" is used to indicate a suitable polymeric material having the typical chemical-physical and mechanical characteristics of elastomers following cross-linking.

In the same way, in the present description and in the subsequent claims, the expression "polymeric cross-inkable material" is used to indicate a non-cross-linked polymeric material capable of taking on the above-mentioned typical chemical-physical and mechanical characteristics of elastomers following cross-linking.

FIG. 1 schematically illustrates a cable 1 for transporting or distributing electrical energy of the so-called low voltage type (where low voltage indicates a voltage smaller than about 1 kV), comprising, starting from the radially innermost position outwards, an electrical energy transmissive element, such as for example a conductor element 2, and an insulation layer consisting of an expanded and cross-linked coating layer 5. A thin sheath, indicated with 10 in FIG. 1, may be optionally arranged in a radially outer position with respect to the expanded and cross-linked coating layer 5.

An expanded and cross-linked coating layer may also be provided in cables of the so-called medium and high voltage type (where average and high voltage indicate, respectively, a voltage of between about 1 kV and about 30 kV and a voltage greater than about 30 kV), of which a possible embodiment is schematically illustrated in FIG. 2.

In the following description, the cable elements which are structurally and functionally equivalent to those previously illustrated with reference to cable 1 for transporting low voltage electrical energy illustrated in FIG. 1 shall be indicated with the same reference signs and shall not be further described.

FIG. 2 illustrates a cable, generally indicated with 101, for transporting or distributing medium voltage electrical energy, which cable comprises an expanded and cross-linked semiconductive coating layer 5 arranged in a radially outer position with respect to a semi-finished cable structure generally indicated with 9 in the above-mentioned figure.

The semi-finished cable structure 9 illustrated in FIG. 2 includes, in particular, in addition to a conductor element 2 and to an inner compact semiconductive layer 3, an electrical insulation layer 8 and an outer compact semiconductive layer 6, such as for example is disclosed in U.S. Pat. No. 6,455,769 in the name of the Applicant.

In the present description and in the subsequent claims, the term "compact semiconductive layer" is used to indicate a layer made of non-expanded semiconductive material, i.e. having an expansion degree substantially equal to zero.

Furthermore, a metallic screen 7, usually made of aluminium or lead, consisting of a continuous tube or of a metallic tape shaped according to a tubular form and welded or sealed so as to ensure hermeticity, is arranged in a radially outer position with respect to the expanded and cross-linked coating layer 5.

As known, in this and other applications in which a metallic screen is used, the presence of the expanded and cross-linked layer allows to absorb in a elastic and uniform way the radial expansion and contraction forces undergone by the different layers of the cable due to the thermal cycles to which the cable is subjected, thus preserving the metallic screen from deformations or rupture during the use thereof.

In the cable 101 illustrated in FIG. 2, the expanded and cross-linked coating layer 5 acts not only as an elastic absorption layer, but also as a semiconductive layer. In order to impart semiconductive properties to the polymeric material constituting the expanded and cross-linked coating layer 5, products known in the art for the preparation of semiconductive polymeric compositions are used. In particular, an electroconductive carbon black, such as for example electroconductive acetylene black or fornace black and the like, may be used.

Finally, again with reference to FIG. 2, an outer sheath 10 is furthermore provided in a radially outer position with respect to the metallic screen 7.

For illustrating purposes, the electrical conductor 2 may have a diameter comprised in the range 2-30 mm, the inner compact semiconductive layer 3 may have a thickness of about 0.1-3 mm, the electrical insulation layer 8 may have a thickness of about 3.5-25 mm and the outer compact semiconductive layer 6 may have a thickness of about 0.1-0.5 mm, so that the semi-finished cable structure 9 may have a diameter from about 5.7 to about 58.5 mm.

Other embodiments of cables for transporting or distributing medium or high voltage electrical energy are known, which cables are completely analogous to the embodiment illustrated in FIG. 2, with the exception that the outer compact semiconductive layer 6 is absent in such embodiments.

The present invention also refers to cables provided with a plurality of transmissive elements as defined above, known in the field with the terms of "bipolar cable", "tripolar cable" and "multipolar cable" depending on the number of transmissive elements incorporated therein (in the mentioned cases in number of two, three or greater, respectively).

In accordance with such definitions, the present invention refers to any number and type of transmissive elements, i.e. not only to unipolar, bipolar, etc. electrical cables for transporting or distributing energy, but also to cables of the mixed energy/telecommunications type comprising, in addition to at least one electrical energy transmissive element, at least one optical fibre or a bundle of optical fibres.

PRIOR ART

Methods for producing cables essentially consisting of at least one electrical transmissive element and of an expanded and cross-linked coating layer in a radially outer position with respect to the at least one transmissive element are known.

Thus, for example, U.S. Pat. No. 6,455,769 in the name of the Applicant describes electrical cables—and respective manufacturing methods—comprising, starting from the radially innermost position outwards, a conductor, an inner compact semiconductive layer, an insulation layer, an outer compact semiconductive layer, an expanded semiconductive layer, a metallic screen and an outer sheath.

The expanded semiconductive layer may be made of cross-linkable material. In the latter case, in accordance with the disclosure of the above-mentioned U.S. Pat. No. 6,455,769, the expansion of the expandable and cross-linkable semiconductive polymeric material intended to constitute the expanded and cross-linked semiconductive coating layer is normally carried out during the extrusion step thereof around a semi-finished cable structure comprising the above-mentioned conductor, inner compact semiconductive layer, insulation layer and outer compact semiconductive layer. The expansion may take place either chemically, by addition of a suitable expanding agent, i.e. an agent capable of evolving a gas under specific pressure and temperature conditions, or physically, by high pressure injection of gas directly into the extruder cylinder. As to the cross-linking, this is carried out—subsequently to the extrusion and expansion steps—on a catenary line under pressure by heating in the presence of a radical initiator, such as for example an organic peroxide.

In the catenary line which, as known, essentially consists of long cross-linking pipes, the cross-linking process is carried out by means of steam or pressurized inert gas.

The need of keeping a pressure condition greater than atmospheric pressure results in the need of using complex and expensive apparatuses, such as for example the above-mentioned catenary lines, with a negative effect on the maintenance and operating costs of such apparatuses and on the overall production costs of the cable. Furthermore, the production method described in U.S. Pat. No. 6,455,769 involves excessively long production times since at least one portion of the catenary line, normally a portion having an extension equal to half the overall length thereof, is intended to cool under pressure the expanded and cross-linked coating layer in order to avoid that bubbles of gas due to the expansion process interfere with the cross-linking process, thus preventing a proper development of the latter.

SUMMARY OF THE INVENTION

The Applicant has found that it is possible to overcome the drawbacks of the prior art by heating the coating layer made of expandable and cross-linkable material at atmospheric pressure by means of a suitable heating fluid.

The adoption of a operating condition of atmospheric pressure simplifies the actuation of the method for producing the cable, while allowing an advantageous reduction in costs and times with respect to the costs and times required by the production methods of the prior art, such as those carried out by means of catenary lines, and in general by means of the known apparatuses operating under pressure.

In accordance with a first aspect thereof, the present invention therefore refers to a method for producing a cable including:
  at least one transmissive element; and
  an expanded and cross-linked coating layer in a radially outer position with respect to said at least one transmissive element, the above-mentioned coating layer comprising a composition including an expandable and cross-linkable polymeric material;
  the method comprising the following steps of:
  a) extruding the composition;
  b) forming a coating layer made of expandable and cross-linkable polymeric material with the composition thus extruded;
  c) expanding said coating layer made of expandable and cross-linkable polymeric material; and
  d) cross-linking said coating layer made of expandable and cross-linkable polymeric material;
  characterized in that the above-mentioned expanding and cross-linking steps c) and d) are carried out by heating the coating layer made of expandable and cross-linkable polymeric material at atmospheric pressure by means of a heating fluid.

Thanks to such features, and in particular thanks to the fact of operating at atmospheric pressure, the method of the invention allows to achieve the above-mentioned advantageous saving in production costs and times of the cable, while carrying out at the same time more effective expansion and cross-linking processes of the coating layer made of expandable and cross-linkable polymeric material. By suitably adjusting the temperature of the heating fluid, in fact, the expansion and cross-linking of the coating layer may be advantageously completed so as not to interfere with each other.

In other words, on the one hand, it is advantageously possible to avoid that the expansion starts too long before cross-linking, with the consequent formation of bubbles of gas which, if incorporated within the coating layer, have a negative influence on the quality of the cable. At the same time, on the other hand, it is advantageously possible to avoid that the cross-linking starts too long before expansion, with the consequent early stop of the expansion process and ensuing insufficient expansion.

The above-mentioned possibility of optimizing the development of the expansion and cross-linking processes by effect of heating at atmospheric pressure also allows—in accordance with a preferred embodiment of the method of the invention, described in greater detail hereafter—to cool the cable obtained up to here as described above at atmospheric pressure, with ensuing further advantageous saving in production costs with respect to the costs associated with the cooling step under pressure, which costs must be borne when the prior art methods are carried out.

Preferably, the heating of the coating layer is carried out in an oven in which the cable provided with the coating layer made of expandable and cross-linkable polymeric material is fed at a suitable feeding rate. The heating temperature being equal, by suitably adjusting the feeding rate of the cable provided with the coating layer made of expandable and cross-linkable polymeric material in the oven, the expansion and cross-linking of such coating layer may be advantageously completed so as not to interfere with each other.

In accordance with an embodiment, the method is carried out in a substantially continuous manner, i.e. in such a way that between the various stages of the overall production process of the cable there are no intermediate storages of semi-finished products, so as to continuously produce a cable provided with an expanded and cross-linked coating layer having an undefined length in a single production line.

Preferably, the heating fluid is subjected to forced circulation. Thanks to an improved heating action ensured by the heating fluid subjected to forced circulation, it is advantageously possible to further improve the effectiveness of the above-mentioned expansion and cross-linking processes.

In accordance with a preferred embodiment of the invention, the above-mentioned heating fluid is subjected to forced circulation at a rate of between about 2 and about 80 m/s and, still more preferably, at a rate of about 40 m/s.

Within such preferred range of values, the heating fluid is subjected to a turbulent flow, which advantageously allows a more effective heating action of the coating layer made of expandable and cross-linkable polymeric material.

According to a preferred embodiment of the invention, the above-mentioned expanding and cross-linking steps of the coating layer made of expandable and cross-linkable polymeric material are carried out by heating such a layer to a temperature comprised between about 120° C. and about 400° C. and, still more preferably, between about 250° C. and about 350° C.

In such a way, an optimal balance between the course of the expansion and the course of the cross-linking is advantageously ensured, i.e. such that the gases produced by the expansion do not prevent the progression of the cross-linking and such that the latter in turn does not prevent the proper and complete development of the expansion.

Preferably, the heating fluid is selected from the group comprising: air, inert gases. Still more preferably, the heating fluid is nitrogen.

Preferably, the above-mentioned composition of the coating layer made of expandable and cross-linkable polymeric material comprises at least one expanding agent and/or at least one cross-linking agent.

Preferably, the above-mentioned composition of the coating layer made of expandable and cross-linkable polymeric material comprises a plurality of expanding agents and/or a plurality of cross-linking agents. In such a way, the possibility of controlling the expansion and cross-linking of the coating layer in an optimal manner is further increased.

In accordance with a preferred embodiment of the invention, the at least one expanding agent and the at least one cross-linking agent have respective decomposition temperatures which differ from each other at most of about 50° C.

When the difference between the decomposition temperatures of the expanding agent and of the cross-linking agent is confined within such preferred range values, the above-mentioned balance between the course of the expansion and the course of the cross-linking is further improved.

Preferably, the at least one expanding agent and the at least one cross-linking agent have respective decomposition temperatures which differ from each other at most of about 30° C.

Preferably, the at least one cross-linking agent is selected from the group comprising: organic peroxides and sulphur. Still more preferably, the at least one cross-linking agent is selected from the group comprising: 2,5-dimethyl-2,5-bis-(ter-butylperoxy)hexane, 2,5-dimethyl-2,5-bis-(ter-butylperoxy)hexine-3-di-ter-butylperoxide, bis-(ter-butylperoxyisopropyl)benzene, ter-butylcumylperoxide, dicumylperoxide, 4,4'-di-ter-butylperoxy-n-butylvalerate, ter-butylperoxy-3,5,5-trimethylhexanoate, 1,1-di-ter-butylperoxy-3,3,5-trimethylcyclohexane, ter-butylperoxybenzoate, dibenzoyl peroxide, bis-(2,4-dichlorobenzoyl)peroxide, bis-(p-chlorobenzoyl)peroxide, 2,2-di-ter-butylperoxybutane, ethyl-3,3-di-ter-butylperoxybutyrate, 2,2'-azo-di-(2-acetoxypropane).

Preferably, the at least one expanding agent is selected from the group comprising: oxydibenzyl sulphonhydrazide, azodicarbamide, paratoluene sulphonylhydrazide, mixtures of organic acids, such as for example citric acid, with carbonates and/or bicarbonates, such as sodium bicarbonate, and the like.

The expandable polymeric material is preferably selected from the group comprising: polyolefins, copolymers of different olefins, unsaturated olefin/ester copolymers, polyesters, polycarbonates, polysulphones, phenolic resins, ureic resins, and mixtures thereof.

Still more preferably, the expandable polymeric material is selected from the group comprising: polyethylene (PE), low density PE (LDPE), medium density PE (MDPE), high density PE (HDPE) and linear low density PE (LLDPE); polypropylene (PP); elastomeric ethylene-propylene copolymers (EPM) or ethylene-propylene-diene terpolymers (EPDM); natural rubber; butylic rubber; ethylene/vinyl ester copolymers, such as for example ethylene/vinyl acetate (EVA); ethylene/acrylate copolymers, in particular ethylene/methyl acrylate (EMA), ethylene/ethyl acrylate (EEA), ethylene/butyl acrylate (EBA); ethylene/alpha-olefin thermoplastic copolymers; polystyrene; acrylonitryle/butadiene/styrene (ABS) resins; halogenated polymers, in particular polyvinyl chloride (PVC); polyurethane (PUR); polyamides; aromatic polyesters, such as polyethylene terephthalate (PET) or polybutylene terephthalate (PBT); and copolymers thereof or mechanical mixtures thereof.

Preferably, the method of the invention comprises the further step of cooling the cable provided with the expanded and cross-linked coating layer.

Still more preferably, such cooling is carried out by means of a cooling fluid, such as air at room temperature.

Preferably, the thickness of the expanded and cross-linked coating layer is between about 0.1 and about 3 mm and, still more preferably, is equal to about 0.8 mm for a medium voltage electrical cable and for a cable of the mixed energy/telecommunications type, and is preferably between about 1-1.5 mm for a high voltage electrical cable.

By respecting such preferred thickness values of the expanded and cross-linked coating layer, it is advantageously possible to cool the cable provided with an expanded and cross-linked coating layer in a short time, which contribute to decrease the overall production time of the cable.

In accordance with a preferred embodiment, particularly suitable in the case of cables for transporting or distributing energy of the medium or high voltage electrical type, the method of the invention further comprises the step of providing the cable provided with an expanded and cross-linked coating layer with a metallic screen. In this case, the expanded and cross-linked coating layer is interposed between a semi-finished cable structure as defined above and such metallic screen, said layer optionally acting as outer semiconductive layer as well, analogously to the description made with reference to the cable of FIG. 2.

The presence of the metallic screen advantageously constitutes a radial barrier against penetration of water, creates a uniform radial electrical field within the cable and at the same time nullifies the electrical field outside the cable, these features making the screen particularly suitable for medium and high voltage cables.

Still more preferably, the method of the invention comprises a further step of coating the metallic screen with an outer sheath, with an advantageous protective action particularly aimed at protecting the cable from damage during the transportation or the laying thereof.

Preferably, the method of the invention comprises a further step of coating the metallic screen with a layer of expanded polymeric material, said layer of expanded polymeric material performing the function of giving the cable an optimal mechanical resistance against accidental impacts, as described in document EP-A-0 981 812 in the name of the same Applicant.

BRIEF DESCRIPTION OF THE DRAWINGS

Additional features and advantages of the invention will become more readily apparent from the description of some illustrative embodiments of a method for producing a cable according to the invention, made hereafter with reference to the attached drawings in which, for illustrative and not limiting purposes, a plant for carrying out said method is shown.

In the drawings.

DETAILED DESCRIPTION OF THE PREFERRED EMBODIMENTS

Figure 3:
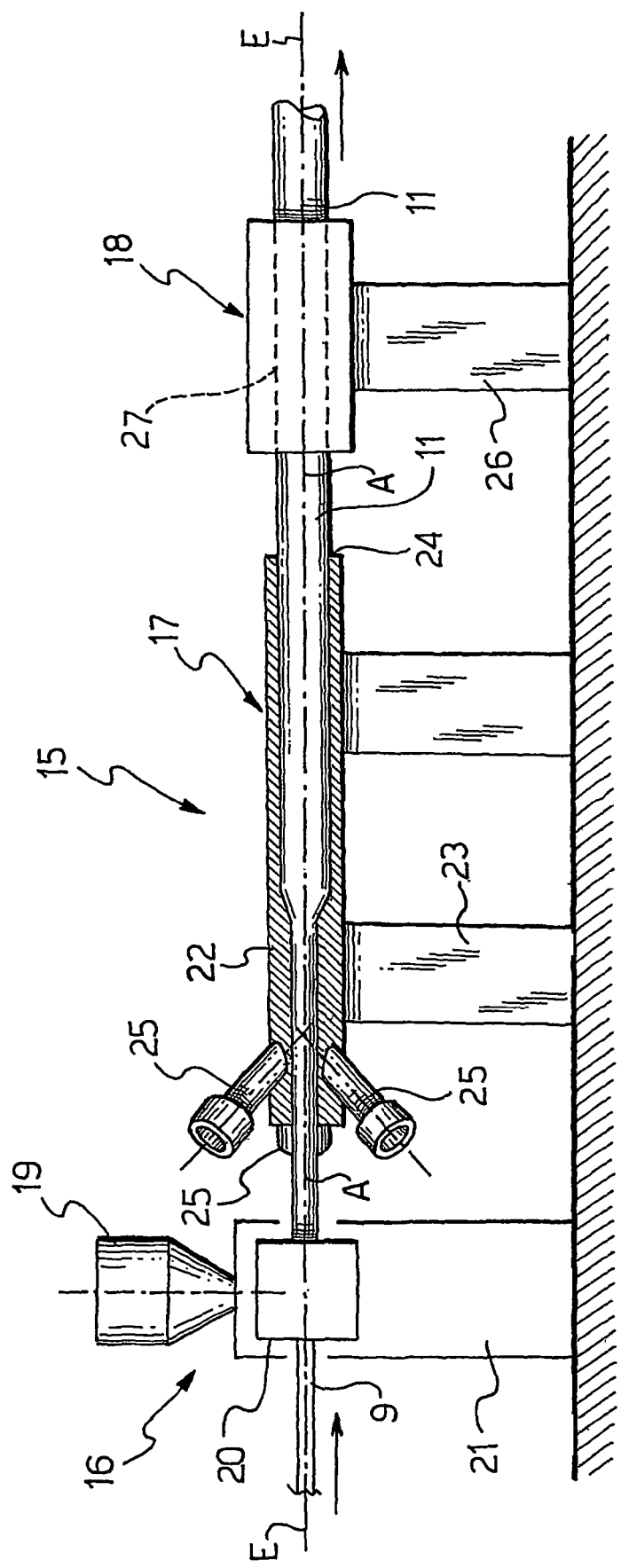
FIG. 3 is a view in partial longitudinal cross-section of a plant intended to carry out the method for producing a cable of the present invention.

With reference to FIG. 3, a plant intended to carry out the method for producing a cable of the present invention is generally indicated with 15, said cable including:
- at least one transmissive element; and
- an expanded and cross-linked coating layer in a radially outer position with respect to said at least one transmissive element, said coating layer comprising a composition including an expandable and cross-linkable polymeric material.

Figure 2:
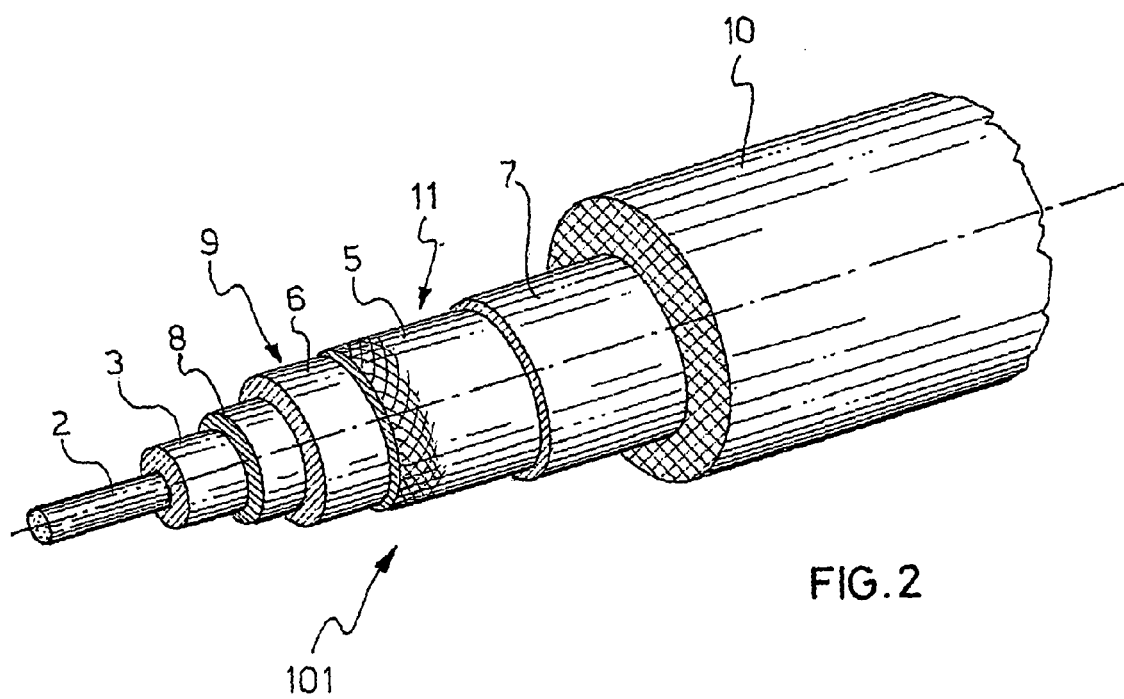
FIG. 2 is a perspective view of a medium voltage electrical cable obtained in accordance with the method for producing a cable of the present invention.

For illustrative purposes, reference shall be made to the production of a medium voltage electrical cable such as the cable illustrated in FIG. 2, whereby there will be a semi-finished cable structure 9 entering the plant 15, the structure 9 comprising in particular a transmissive element including an electrical conductor 2, for example consisting of a copper conductor, an inner compact semiconductive layer 3, an electrical insulation layer 8 and an outer compact semiconductive layer 6.

The inner compact semiconductive layer 3 is for example made of an ethylene-propylene elastomeric copolymer (EPR) containing carbon black, and the electrical insulation layer 8 is for example made of EPR.

On the other hand, there will be a cable product 11 coming out from the plant 15, the cable product 11 comprising, in a radially outer position with respect to the conductor element 2, an expanded and cross-linked coating layer 5. In greater detail, with reference to the embodiment of the cable 101 of FIG. 2, the cable product 11 comprises in particular an expanded and cross-linked coating layer 5 having a semiconductive nature and the semi-finished cable structure 9, the expanded and cross-linked coating layer 5 being arranged in a radially outer position with respect to the semi-finished cable structure 9.

Figure 1:
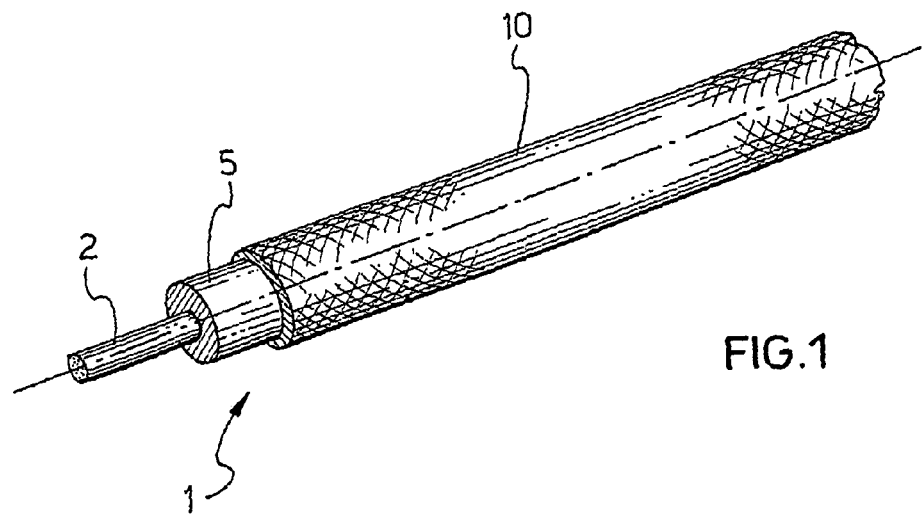
FIG. 1 is a perspective view of a low voltage electrical cable obtained in accordance with the method for producing a cable of the present invention.

Although reference is made to the production of a medium voltage electrical cable such as the cable of FIG. 2, the method of the invention carried out by the plant 15 illustrated in FIG. 3 is analogously capable of producing any finished cable or cable product 11 comprising an expanded and cross-linked coating layer 5, independently of the nature of the semi-finished cable structure 9 entering the plant 15. For illustrative purposes, the method of the invention allows to produce both a low voltage electrical cable, such as for example the cable of FIG. 1, and a high voltage electrical cable, not illustrated, and a mixed electrical-optical cable, also not illustrated.

With reference to FIG. 3, the plant 15 comprises an extrusion apparatus 16, an expansion and cross-linking apparatus 17 and an air cooling device 18.

The extrusion apparatus 16 comprises an extruder 19 and an extrusion head 20 supported by a support frame 21. A longitudinal cavity intended to receive the semi-finished cable structure 9 is coaxially defined in the extrusion head 20 along an extrusion direction E-E.

The extrusion and cross-linking apparatus 17 is arranged downstream of the extrusion apparatus 16 and, preferably, is arranged along the same extrusion direction E-E so as to move the semi-finished cable structure 9 along a single conveying direction A-A, at a predetermined conveying rate, in the whole production line of the cable 101 by means of suitable moving means, such as for example pulling and pushing means arranged downstream and, respectively, upstream of the plant 15; which are conventional per se and not illustrated.

The expansion and cross-linking apparatus 17 illustrated in FIG. 3 comprises an oven 22 with forced circulation of hot air supported by a frame 23 and provided with a longitudinal cavity 24 intended to receive the semi-finished cable structure 9 coated with the coating layer 5 made of expandable and cross-linkable polymeric material. Such a type of oven is commercially available from Colmec.

At a first portion of the oven 22, in a position proximal to the extrusion apparatus 16, the oven 22 is provided with ventilation means, for example including a plurality of hot air blowers, all indicated with 25. In FIG. 3 the blowers 25 are in number of three and are angularly staggered by 120° from each other and are mounted in a cantilevered manner from the oven 22 in an inclined manner, so as to form a predetermined angle with the longitudinal axis of the oven. In such a way, through the blowers 25, hot air is fed in a direction cocurrent with the conveying direction A-A of the semi-finished cable structure 9 coated with the coating layer 5 made of expandable and cross-linkable polymeric material.

The above-mentioned air cooling device 18 is arranged downstream of the expansion and cross-linking apparatus 17, is supported by a frame 26 and is aligned with the conveying direction A-A. A longitudinal cavity 27 intended to receive the cable product 11 is coaxially defined in the cooling device 18. The diameter of the longitudinal cavity 27 is substantially equal to the diameter of the cavity 24 of the oven 22.

With reference to the apparatus described above, in order to further describe the invention, an illustrative example of a preferred embodiment of the method according to the invention for producing a cable including at least one transmissive element, such as the medium voltage electrical cable 101 of FIG. 2, is provided hereafter.

Example 1

In accordance with a first step of the method of the invention, a composition including an expandable and cross-linkable polymeric material, for illustrative purposes the composition shown in Table I (in parts by weight per 100 parts by weight of base polymer, phr) was extruded by means of the extruder 19.

TABLE I

| Ingredient | Phr |
|---|---|
| Keltan ® 4703 | 120 |
| Ensaco ® 250 | 70 |
| Flexon ® 815 | 45 |
| Microcarb ® SB | 20 |
| ZnO | 8 |
| Stearic acid G3 | 2 |
| Kezadol ® GR | 5 |
| J-550 ® | 15 |
| Perox ® DCSC | 6.8 |
| Unifoam ® AZ VE 40S | 0.8 |
| Celogen ® OT | 2.14 |

Keltan ® 4703 (DSM): ethylene-propylene-diene terpolymer (EPDM);
Ensaco ® 250 (Erachem Europe): carbon black;
Flexon ® 815 (Exxon): paraffinic mineral oil;
Microcarb ® SB: (Nuova Sima): calcium carbonate;
ZnO (A-ESSE): zinc oxide;
Stearic acid G3 (FACI): stearic acid;
Kezadol ® GR (Kettliz Chemie): calcium oxide;
J-550 ® (SANYO): sodium polyacrylate (finely ground);
Perox ® DCSC (Atofina): dicumylperoxide;
Unifoam ® AZ VE 40S (Unifoam Company Limited): azodicarbamide;
Celogen ® OT (Crompton, OSI Specialities): oxydibenzyl sulphonhydrazide.

More specifically, the components of the mixture indicated in Table I were mixed in a Banbury closed mixer (1.2 l working volume) loading firstly the base polymer, then, after a brief period of processing, the carbon black and the other less volatile additives, in other words all the additives of Table I with the exception of the cross-linking agent (dicumylperoxide) and the expanding agents (azodicarbamide and oxydibenzyl sulphonhydrazide).

The mixing was carried out for about 6 minutes at about 150° C. At the end of mixing, the more volatile components, in other words the cross-linking agent and the expanding agents, were added to the mixture thus obtained in an open mixer, the material being previously cooled to about 100° C. This is done in order to avoid early volatilization or decomposition of the cross-linking agent and of the expanding agents, which could have caused uncontrolled cross-linking and, respectively, expansion of the polymer.

The polymeric composition of Table I intended to form the expanded and cross-linked coating layer 5 was extruded by the extruder 19 simultaneously with the convey of the semi-finished cable structure 9 to be coated along the extrusion direction E-E.

In accordance with a second step of the method of the invention, after the convey of the semi-finished cable structure 9, prepared in a way known per se, within the longitudinal cavity of the extruder head 20, a coating layer made of expandable and cross-linkable polymeric material was formed on the semi-finished cable structure 9 with the composition thus extruded. For illustrative purposes, the thickness of such a coating layer made of expandable and cross-linkable polymeric material deposited on the semi-finished cable structure 9 was of about 0.5 mm.

At this point, in accordance with what is illustrated in FIG. 3, the semi-finished cable structure 9 coated with the coating layer made of expandable and cross-linkable polymeric material was conveyed within the oven 22 along the conveying direction A-A at a predetermined conveying rate, for example equal to about 7 m/min.

In accordance with a subsequent step of the method of the invention, the coating layer made of expandable and cross-linkable polymeric material thus obtained was expanded and cross-linked by means of air heating at atmospheric pressure, the air, in accordance with the embodiment of the plant 15 of FIG. 3, being blown into the oven 22 through the blowers 25.

More specifically, the air was subjected to forced circulation at a rate of about 40 m/s, so as to ensure a turbulent flow and to increase, in such a way, the effectiveness of the heating action of the coating layer made of expandable and cross-linkable polymeric material.

Furthermore, in accordance with a preferred embodiment of the invention, the above-mentioned heating step was carried out at a temperature of about 300° C.

At the end of the expansion and cross-linking step, the cable product 11 comprising the expanded and cross-linked coating layer 5, the thickness of which measured about 0.8 mm, was obtained.

Subsequently, the cable product 11 was subjected to air cooling to room temperature in the cooling device 18.

Subsequently, a metallic screen 7, for example made of aluminium, was arranged in a radially outer position with respect to the coating layer 5, in a way known per se and not illustrated, and a polymeric sheath 10, for example made of PE was extruded in a radially outer position with respect to the metallic screen 7 by means of a further extrusion apparatus, also known per se and not illustrated, thus obtaining the cable 101.

In the illustrative example performed, by setting a rotation speed of the extruder 19 equal to about 10 rev/min, and with an oven 22 having a length equal to about 3.5 m, a cable 101 was obtained at a production rate of about 7 m/min, which cable had a density equal to about 0.72 g/cm$^3$ and a compression set at 23° C. equal to 21%, measured according to standard ASTM D395, method B.

The invention claimed is:

1. A method for producing a cable comprising:
   at least one transmissive element; and
   an expanded and cross-linked coating layer in a radially outer position with respect to said at least one transmissive element, said coating layer comprising a composition including an expandable cross-linkable polymeric material;

said method comprising the steps of:
   a) extruding said composition via around said at least one transmissive element via an extruder;
   b) forming a coating layer made of expandable and cross-linkable polymeric material with the composition thus extruded;
   c) expanding said coating layer made of expandable and cross-linkable polymeric material; and d) cross-linking said coating layer made of expandable and cross-linkable polymeric material;

said expanding and cross-linking steps c) and d) being carried out downstream of said extruder by heating said coating layer made of expandable and cross-linkable polymeric material at atmospheric pressure by means of a heating fluid, and wherein said method is operated in a manner to avoid expansion and cross-linking of said expandable and cross-linkable polymeric material prior to said expanding and cross-linking steps c) and d).

2. The method according to claim 1, wherein said heating fluid is subjected to forced circulation.

3. The method according to claim 1, wherein said heating fluid is subjected to forced circulation at a rate between about 2 and about 80 m/s.

4. The method according to claim 1, wherein said expanding and cross-linking steps c) and d) are carried out by heating said coating layer made of expandable and cross-linkable polymeric material to a temperature between about 120° C. and abut 400° C.

5. The method according to claim 1, wherein said heating fluid is selected from the group of air and inert gases.

6. The method according to claim 1, wherein said composition comprises at least one expanding agent and at least one cross-linking agent.

7. The method according to claim 6, wherein said at least one expanding agent and said at least one cross-linking agent have respective decomposition temperatures which differ from each other by at most about 50° C.

8. The method according to claim 6, wherein said at least one cross-linking agent is selected from the group of organic peroxides and sulphur.

9. The method according to claim 8, wherein said at least one cross-linking agent is selected from the group of 2,5-dimethyl-2,5-bis-(ter-butylperoxy)hexane, 2,5-dimethyl-2,5-bis(ter-butylperoxy)hexine-3-di-ter-butylperoxide, bis-(ter-butylperoxyisopropyl)benzene, ter-butylcumylperoxide, dicumylperoxide, 4,4'-di-terbutylperoxy-n-butylvalerate, ter-butylperoxy-3,5,5-trimethylhexanoate, 1,1-di-ter-butylperoxy-3,3,5-trimethylcyclohexane, ter-butylperoxybenzoate, dibenzoylperoxide, bis-(2,4-dichlorobenzoyl)peroxide, bis-(p-chlorobenzoyl) peroxide, 2,2-di-ter-butylperoxybutane, ethyl-3,3-di-ter-butylperoxybutyrate, and 2,2'-azo-di-(2-acetoxypropane).

10. The method according to claim 6, wherein said at least one expanding agent is selected from the group of oxydibenzyl sulphonhydrazide, azodicarbamide, paratoluene sulphonylhydrazide, and mixtures of organic acids with carbonates and/or bicarbonates.

11. The method according to claim 1, further comprising the step of cooling said cable provided with said expanded and cross-linked coating layer.

12. The method according to claim 1, further comprising the step of providing said cable having said expanded and cross-linked coating layer with a metallic screen.

13. The method according to claim 12, further comprising the step of coating said metallic screen with an outer sheath.

* * * * *